United States Patent
Clausen et al.

(10) Patent No.: US 11,736,828 B2
(45) Date of Patent: Aug. 22, 2023

(54) SIMULTANEOUS AND CONSISTENT HANDLING OF IMAGE DATA AND ASSOCIATED NOISE MODEL IN IMAGE PROCESSING AND IMAGE SYNTHESIS

(71) Applicant: Dotphoton AG, Zug (CH)

(72) Inventors: Christoph Clausen, Gramatneusiedl (AT); Bruno Sanguinetti, Zug (CH)

(73) Assignee: DOTPHOTON AG, Zug (CH)

( * ) Notice: Subject to any disclaimer, the term of this patent is extended or adjusted under 35 U.S.C. 154(b) by 0 days.

(21) Appl. No.: 17/815,978

(22) Filed: Jul. 29, 2022

(65) Prior Publication Data
US 2023/0048097 A1  Feb. 16, 2023

(30) Foreign Application Priority Data
Aug. 13, 2021  (EP) .................................... 21191349

(51) Int. Cl.
*H04N 25/68* (2023.01)
*H04N 25/46* (2023.01)
(Continued)

(52) U.S. Cl.
CPC ............. *H04N 25/68* (2023.01); *G06F 17/12* (2013.01); *H04N 25/46* (2023.01)

(58) Field of Classification Search
CPC ........ H04N 25/68; H04N 25/46; H04N 9/646; G06F 17/12; G06T 5/002; G06T 5/50; G06T 1/20
See application file for complete search history.

(56) References Cited

U.S. PATENT DOCUMENTS 7,683,948 B2   3/2010   Yanof et al.
8,860,851 B2   10/2014  Goma et al.
(Continued)

FOREIGN PATENT DOCUMENTS

EP    3 820 150 A1    5/2021

OTHER PUBLICATIONS

Veldkamp, Wouter J.H., et al., "A Technique for Simulating the Effect of Dose Reduction on Image Quality in Digital Chest Radiography," *Journal of Digital Imaging*. vol. 22, No. 2, pp. 114-125 (Apr. 2009).
Seibert, J. Anthony, et al., "Flat-field correction technique for digital detectors," *SPIE*, vol. 3336, pp. 348-354 (Feb. 1998).
(Continued)

*Primary Examiner* — Marly S Camargo
(74) *Attorney, Agent, or Firm* — Christensen, Fonder, Dardi & Herbert PLLC (57) ABSTRACT

A method for processing image data having noise and information, including: acquiring input raw image data having pixels of an image sensor used to take the image data, processing the input data, and outputting processed image-output data. The step of acquiring input data includes acquiring an input-noise model from the input data, and the step of processing the input raw image data includes a preprocessing operation and determining an output-noise model adapted to reflect noise in the output data, and producing output raw-image data consistent with the output-noise model, and the step of outputting the processed image data includes storing and/or transmitting the output raw image data and the output-noise model, which together form the output data, in a manner linking the output raw image data to the output-noise model, thereby allowing processing of the output data, as input data, such that the processing is adapted for pipeline processing.

17 Claims, 1 Drawing Sheet

(51) Int. Cl.
*G06F 17/12* (2006.01)
*H04N 9/64* (2023.01)
*G06T 5/00* (2006.01)
*G06T 5/50* (2006.01)
*G06T 1/20* (2006.01)

(56) References Cited

U.S. PATENT DOCUMENTS

| | | | | |
|---|---|---|---|---|
| 9,143,709 | B1 | 9/2015 | Winn | |
| 9,525,804 | B2 * | 12/2016 | Baqai | H04N 9/646 |
| 9,626,745 | B2 * | 4/2017 | Baqai | G06T 5/002 |
| 9,667,842 | B2 * | 5/2017 | Baqai | H04N 23/843 |
| 9,819,914 | B2 * | 11/2017 | Kong | G06T 5/002 |
| 11,200,641 | B1 * | 12/2021 | Baqai | G06T 5/002 |
| 11,593,391 | B2 * | 2/2023 | Ricardi | G06T 5/002 |
| 2003/0001078 | A1 | 1/2003 | Baharav et al. | |
| 2008/0205731 | A1 * | 8/2008 | Busch | G06T 1/008 |
| | | | | 382/131 |
| 2016/0065794 | A1 | 3/2016 | Baqai et al. | |
| 2020/0193654 | A1 * | 6/2020 | Yanoff | G06T 11/005 |
| 2020/0200848 | A1 * | 6/2020 | Yamashita | G01V 3/00 |

OTHER PUBLICATIONS

Azzari, Lucio, et al., "Variance Stabilization for Noisy+Estimate Combination in Iterative Poisson Denoising," *IEEE Signal Processing Letters,* vol. 23, Issue 8, pp. 1086-1090 (Aug. 2016).

Lim, SukHwan, "Characterization of Noise in Digital Photographs for Image Processing," *SPIE,* vol. 6069, 10 pages (2006).

Foi, Alessandro, et al., "Practical Poissonian-Gaussian Noise Modeling and Fitting for Single-Image Raw-Data," *IEEE Transactions on Image Processing,* vol. 17, No. 10, pp. 1737-1754 (Oct. 2008).

Borges, Lucas Rodrigues, et al., "Unbiased Injection of Signal-Dependent Noise in Variance-Stabilized Range," *IEEE Signal Processing Letters,* vol. 23, No. 10, pp. 1494-1498 (Oct. 2016).

Mackenzie, Alistair, et al., "Conversion of mammographic images to appear with the noise and sharpness characteristics of different detector and x-ray system," *Medical Physics,* vol. 39, No. 5, pp. 2721-2734 (May 2012).

Svalkvist, Angelica, et al., "Simulation of dose reduction in tomosynthesis," *Medical Physics,* vol. 37, No. 1, pp. 258-269 (Jan. 2010).

Borges, Lucas R., et al. "Method for Simulating Dose Reduction in Digital Breast Tomosynthesis," *IEEE Transactions on Medical Imaging,* vol. 36, No. 11, pp. 2331-2342 (2017).

* cited by examiner

SIMULTANEOUS AND CONSISTENT HANDLING OF IMAGE DATA AND ASSOCIATED NOISE MODEL IN IMAGE PROCESSING AND IMAGE SYNTHESIS

RELATED APPLICATIONS

The present application claims priority to European Patent Application No. 21191349.6, filed Aug. 13, 2021, the disclosure of which is hereby incorporated by reference herein in its entirety.

FIELD OF THE INVENTION

The present invention pertains to the field of image processing and, in particular, concerns a method for processing of image data, wherein said image data comprises noise and information, the method comprising the steps of acquiring input data comprising input raw image data to be processed for storage and/or transmission, said input raw image data comprising values of pixels of an image sensor used to take the image data, processing said input raw image data, and outputting the processed image data by providing output data.

BACKGROUND OF THE INVENTION

In general, the present invention is situated in the context of image sensors which are finding its way into more and more devices. Image data can hence be readily and cheaply produced in large amounts, and sophisticated processing algorithms enable a vast range of applications.

The overall performance of the processing algorithms generally depends heavily on the quality of the image data. It is often best to perform any kind of processing and analysis starting from the raw image data, that is, the unaltered image data from the acquisition device. Operations including but not limited to converting image data from color filter arrays into RGB data or applying standard lossy compression can lead to significant information and quality loss, and should be avoided. For this reason, the applicant has previously developed an image compression technique where the decompressed image data is statistically equivalent to the raw uncompressed sensor data, as disclosed in the European patent application EP 3 820 150.

Raw image data often suffers from imperfections caused by, for example, a non-uniform response or bad pixels of the image sensor, imperfect illumination, or imperfect optical elements that lead to distortion and vignetting. To achieve better results from image processing and analysis, and in addition subjectively better-looking images, numerous methods have been developed in the prior art to address such issues. While these methods are quite successful at improving the appearance of individual images, they fail to maintain the statistical properties of the image data due to the fact, as is generally recognized, that the noise of raw image data contains a signal-dependent component with non-linear behavior. For this reason, the application of linear corrections, such as scaling of pixel values or substituting pixel values by averages of a neighborhood, modifies the local characteristics of the noise and makes the noise inconsistent across the image.

U.S. Pat. No. 7,683,948, for example, discloses a method for bad pixel replacement in image processing, where corrupted pixels are detected and replaced by averages, means, maximums or other statistical functions of selected nearby pixels. The application of averages, means or medians produces replaced pixel values with a noise level below the expectation, which will become apparent in the simultaneous processing of several images in a sequence.

The document with the title "Flat-field correction technique for digital detectors" by Seibert et al. reveals a method for correcting a non-uniform response of the sensor. The method is based on measuring response curves for each individual pixel. The curves are then approximated by a linear model, generating two parameters per pixel. The flat-field correction is then achieved using normalization to the pixel-specific response curves. While this approach helps to improve the appearance of the image, it almost certainly worsens the statistical characteristics of the image data. More recently, U.S. Pat. No. 9,143,709 adapts the method to make it suitable for image sensors with a non-linear response, but the above mentioned issue with inconsistent noise remains.

Also the Digital Negative (DNG) Specification by Adobe Inc. recognizes the need to correct for bad pixels and vignetting. This is addressed by providing specially parametrized operations, represented by so-called Opcodes, for those particular purposes. The Opcodes in question are FixVignetteRadial, FixBadPixelsConstant and FixBadPixelsList. However, similar to the prior art cited above, the implementations do not seek to preserve a consistent noise in the sense as set out above. Specifically, FixVignetteRadial works by applying a radially varying normalization, equivalent to the methods of the prior art above; and FixBadPixelsConstant and FixBadPixelsList are aimed at the correction of bad pixels using interpolation, which is equivalent to replacing the pixel value by a local average.

Some prior art also uses noise models for image processing. For example, said DNG specification permits to store information about the noise profile in the DNG file format. Here, the main purpose is use of the noise profile for denoising. However, the majority of image data does not come with any information about the noise characteristics, and owing to a varying amount of correction and preprocessing, a suitable noise model may not even exist. Denoising methods have been developed to estimate the noise parameters directly from the image data, such as proposed for example in the article "Variance Stabilization for Noisy+Estimate Combination in Iterative Poisson Denoising" by Azzari and Foi. However, the estimation of the noise model directly from the image data is often poor and such techniques cannot be reliably used for general image processing purposes.

Noise models also provide benefits to applications other than denoising, for example to the field of medical imaging with x-rays, where the possibility of a reduced radiation exposure for patients for different imaging modalities can be studied through simulations. Here, a lower x-ray dose comes at the cost of a decreased signal-to-noise ratio (SNR), which in turn can only be realistically simulated by using a noise model. A method for simulating dose reduction through a combination of scaling and noise injection is disclosed in the article "A Technique for Simulating the Effect of Dose Reduction on Image Quality in Digital Chest Radiography" by Veldkamp et al., wherein a noise model is used for said noise injection. However, like in the applications mentioned above, the use of noise models remains quite limited also in this prior art application.

Finally, more and more applications rely on machine learning techniques for the processing and/or interpretation of image data. Whereas in more classical image processing the core challenge was typically the invention and development of a suitable algorithm, an additional challenge in the context of machine learning is the availability of large amounts of high-quality training data.

To obtain reliable results with machine learning, the training image set must contain samples for all the variations that are expected in the target environment, and the amount of training data grows exponentially with the parameter space. This issue has been partially alleviated by the introduction of data augmentation, that is, by adding to the training set synthetic images that are modified versions of existing data. Examples of such modifications include geometric transformations (rotation, translation, scaling and flipping) as well as manipulation of contrast and color, or the injection of noise. Such kind of data augmentation according to prior art doesn't comprise use of noise models.

In summary, the correction of imaging imperfections and the generation of synthetic images according to prior art have the drawback that, by focusing on the appearance of the image, they neglect one of the main characteristics of the raw image data, namely the very specific relationship between signal and noise originating from fundamental physical principles and technical properties of the acquisition device. Breaking this relationship prevents the reliable use of the noise contained in the image raw data and/or of measurement uncertainties in processing algorithms, introduces confusing elements in training sets for machine learning, and makes it practically impossible to find a suitable and consistent normalization of image data stemming from different sensors.

SUMMARY OF THE INVENTION

It is the object of the present invention to overcome the above mentioned drawbacks. In general, it is an object of the present invention to provide methods of image processing that maintain a consistent noise model across the entire image. It is a further object of the present invention to enable users of image data to obtain image data with well-defined statistical properties and to make the statistical properties available for their own calculations and analyses based on these image data.

It is a further object of the present invention to provide methods of image preprocessing that correct for various imperfections present in the acquisition hardware or conditions.

It is another object of the present invention to provide methods for the generation of synthetic image data from existing image data, with the aim that the generated synthetic image data is well-suited for the training of machine-learning algorithms, the validation of image processing under challenging conditions, and other similar purposes.

To this effect, the present invention proposes a method which is characterized by the features enumerated in claim 1 and which allows to achieve the objectives identified above. In particular, a method according to the present invention distinguishes from prior art by the fact that the step of acquiring input data comprises the step of
  acquiring an input noise model from said input data, said input noise model being adapted to reflect noise present in said input raw image data, said input raw image data and said input noise model together forming said input data in a manner linking the input raw image data to the input noise model,
by the fact that the step of processing said input raw image data comprises at least one of the processing operations of
  correcting pixel values of said input raw image data,
  applying flat-field correction to said input raw image data,
  applying correction of photo-response-non-uniformity to said input raw image data,
  applying a binning and/or averaging operation to said input raw image data,
  performing normalization of said input raw image data,
  applying a rounding and/or truncation operation and/or integer quantization to said input raw image data,
  performing image synthesis, in particular by creating and/or adding synthetic images based upon said input raw image data and/or by modulating said input raw image data,
said processing step further comprising the steps of
  determining, based upon said input noise model and depending on said processing operation(s) applied to the input raw image data, an output noise model adapted to reflect noise present in said output data, and
  producing, based upon said processing operation(s) applied to the input raw image data as well as on said input noise model and/or said output noise model, output raw image data which is statistically consistent with said output noise model,
and by the fact that the step of outputting the processed image data comprises
  storing and/or transmitting said output raw image data and said output noise model, which together form said output data, in a manner linking the output raw image data to the output noise model,
such as to allow for processing of said output data, as input data, by any one of said processing operations, alone or in any combination thereof, such that said processing is adapted for pipeline processing.

In this manner, image data and noise model are considered as inseparable entities that pass through the image processing pipeline together. The individual processing steps in the pipeline may modify either the image data or the noise model, or both. Therefore, the processed image data in any case have statistical characteristics which are consistent with the output noise model. The noise model further enables users of the image data to obtain uncertainties for the individual pixel values, and hence for their own calculations and analyses based on these pixel values.

Furthermore, the invention provides, by means of at least some of said processing operations, methods for replacement of dead pixel values, correction of photo-response non-uniformity, and flat-field correction, including correction of inhomogeneous illumination and vignetting. Such image preprocessing is performed in a manner allowing that the noise model of the input data remains valid after the preprocessing, i.e. remains applicable to the output data.

The invention also provides for methods allowing to generate synthetic image data, in particular to generate synthetic image data that follows the same noise model as the input data. Specifically, methods to generate synthetic images that simulate a reduced exposure time or light-collection are provided.

A method according to the present invention may be realized in various embodiments.

In a particularly preferred embodiment, said input noise model and/or said output noise model is/are represented by a mapping of mean pixel values of the values of a given pixel of the image sensor used to take the image data to pixel value standard deviations, a mapping of mean pixel values to pixel value variances, or a mapping of mean pixel values to signal-to-noise ratios.

Even more preferably, said input noise model and/or said output noise model is/are adapted to represent noise in said input raw image data and/or said output raw image data which follows a Poisson-Gaussian distribution.

In another particularly preferred embodiment, producing output raw image data which is statistically equivalent as compared to said input raw image data as well as consistent with said output noise model is assured by applying a transformation representing a noise-consistent scaling operation to the values of a given pixel of an image sensor used to take the image data, wherein said transformation may perform a pixel value reduction.

Other features and advantages of the present invention are mentioned in the dependent claims as well as in the description disclosing in the following, with reference to the figures, the invention in more detail.

BRIEF DESCRIPTION OF THE DRAWINGS

The attached figures exemplarily and schematically illustrate the principles as well as several embodiments of the present invention.

DETAILED DESCRIPTION OF THE INVENTION

In the following, the invention shall be described in detail with reference to the above mentioned figures.

Figure 1:
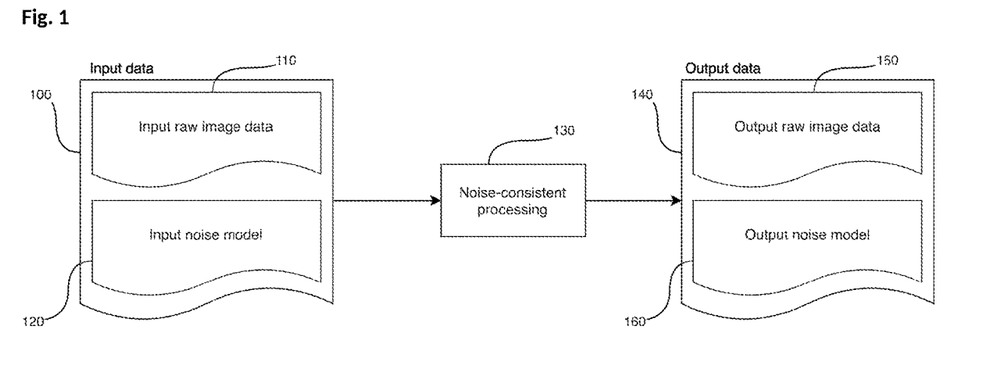
FIG. 1 is a schematic illustration of a noise-consistent image processing according to the present invention.

The concept of this invention is illustrated in FIG. 1. The invention is concerned with the processing of raw image data 110, but in contrast to established methods, the raw image data 110 only is one part of the input data 100 to the processing algorithm 130. The processing algorithm 130 requires a noise model 120 as a second input. Raw image data 110 and noise model 120, forming together the input data 100, are then processed together to produce output data 140, consisting of output raw image data 150 and an output noise model 160. The processing 130 produces output raw image data 150 where every pixel of the output is consistent with the output noise model 160. Examples of noise-consistent processing 130 will be given below. For some processing algorithms, the output noise model 160 will be identical to the input noise model 120.

The reason that the output image data 150 is labelled as raw is that it is statistically equivalent to actual raw image data coming from a sensor for which the output noise model 160 applies. Hence, the output data 140 is adapted to serve as input data 100 for another step of noise-consistent processing 130, such that a whole processing pipeline can be constructed based thereupon.

Noise Models

Noise models are an indispensable building block of the current invention. According to, e.g., the EMVA1288 standard, the following considers as a noise model a mapping $\sigma_y(\mu_y)$ that relates the standard deviation $\sigma_y$ of the values y of a given pixel to its mean value $\mu_y$. In general, the mean value $\mu_y$ depends on the flux and wavelength of the photons hitting the pixel, but the standard deviation $\sigma_y$ only depends on the mean value $\mu_y$. While the following will focus on the above introduced mapping $\sigma_y(\sigma_y)$, equivalent mappings exist which can be used to extract $\sigma_y(\mu_y)$, such as the dependence of the pixel variance $\sigma_y^2$ on the mean value $\mu_y$ or the signal-to-noise ratio $$SNR_y = \frac{\mu_y - \mu_{y,dark}}{\sigma_y},$$

where $\mu_{y,dark}$ is the black level, i.e. the mean pixel value in absence of illumination.

The above mentioned mapping/model is related to so-called temporal noise which quantifies the pixel value fluctuations for repeated acquisitions under identical conditions. In principle, each pixel of a given image sensor can have its own characteristic mapping $\sigma_y(\mu_y)$, but modern image sensors have reached an extremely good uniformity, such that in many cases using the same model for all pixels of the sensor will form a good approximation. Nevertheless, an image sensor can exhibit spatial noise that quantifies the differences of the mean values of different pixels exposed to identical illumination. Spatial noise can often be reduced or even removed with the help of preprocessing. Bad pixels can be considered as an extreme form of spatial noise.

Depending on the type of image data to be processed, a suitable parametrization of the mapping $\sigma_y(\mu_y)$ may serve as digital representation for the noise model. Examples hereof, usable as input noise model 120 or output noise model 160, are

- a finite set of points $\{(\mu_i, \sigma_i)\}$ from which a continuous model $\sigma_y(\mu_y)$ is obtained by linear or non-linear interpolation or by any other appropriate approximation for said set of points, or
- a set of coefficients used to construct a polynomial that approximates $\sigma_y(\mu_y)$, or
- any kind of function with free parameters combined with specific values for those parameters.

For the purpose of noise-consistent processing 130, the input raw image data 110 is combined with the digital representation of the input noise model 120 to form the input data 100. In various embodiments of the invention which will be described in the following, this combination can be achieved in different ways or any of its combination, such as

- storing the raw image data together with the noise model in a suitable (single) container file, for example a file in the Tagged Image File Format (TIFF), or
- storing the noise model in a so-called sidecar file, that is, a (second) file that is connected to the (first) file wherein are stored the raw image data, said sidecar file being adapted to store additional (meta-)data that is not supported by the raw image data file, or
- storing the noise model in a database that links specific raw image data, stored a corresponding (single) raw image data file, to its associated noise model.

In any case, according to the present invention, storing the noise model means storing a digital representation of the parameters for the model. In some embodiments of the invention, these parameters are passed to a function with fixed definition. In other embodiments, the implementation consists of a catalog of functions, and the specific function to be used is selected by an additional identifying parameter. While some embodiments of the invention make use of noise models in the very general sense, as discussed so far, other embodiments will specialize on the Poisson-Gaussian noise model typically used for linear image sensors, where the sensor output is directly proportional to the amount of incoming light. The Poisson-Gaussian noise model is given by $$\sigma_y(\mu_y) = \begin{cases} \sigma_{y,dark} & \text{for } \mu_y < \mu_{y,dark} \\ \sqrt{K(\mu_y - \mu_{y,dark}) + \sigma_{y,dark}^2} & \text{otherwise.} \end{cases}$$

where $\sigma_{y,dark}$ represents the standard deviation of the pixel values in the absence of light and is often termed readout noise, $\mu_{y,dark}$ is the mean of the pixel values in the absence of light, and K is a gain factor. Hence, the Poisson-Gaussian noise model is described by the 3 parameters $\{K, \mu_{y,dark}, \sigma_{y,dark}\}$.

It should be noted that the Poisson-Gaussian noise model is applicable to raw image data output by the vast majority of image sensors. It is a formal expression of the statistics of the fluctuations of pixel values that naturally occur in image acquisition with linear sensors. Despite its ubiquity, its importance is generally ignored in prior art concerning image data correction and processing.

Noise-Consistent Processing

The image data processing that is the subject of this invention can be divided into two categories. The first category is image preprocessing, mainly with the purpose of correcting imperfections in acquisition hardware or conditions, or of standardizing the image data in a specific way. The second category is concerned with the synthesis of image data, which can then be used to test and improve the reliability of image processing algorithms, or to enrich the training data set in a machine-learning context.

While both categories of processing exist in the prior art, no attention is paid in prior art to the underlying noise model, and no effort is made to produce output data that is consistent with the noise model or to consider how the processing affects the image statistics, and hence the noise model. In prior art, only processing algorithms specifically concerned with noise, like denoising and deconvolution, occasionally use noise models in a specific and limited manner, such as mentioned in the introduction. Even in these cases, the focus of prior art has always been on the single operation concerned, without attempting to generalize the methods to a whole processing pipeline and without producing output data that remains consistent with some noise model.

Nevertheless, images with a consistent and accurate noise model across the entire image allow for much more reliable processing, in particular if the noise model is taken into account in the processing algorithm. Conversely, images that do not follow any consistent noise model have the tendency to confuse algorithms with their unexpected statistics. This is in particular true for algorithms based on deep learning and neural networks which consider all aspects of the image data in their analysis, including noise and noise correlations.

Two important remarks in this context are that a) if the input is only a single pixel value and its noise model, no operation can reliably increase the signal-to-noise ratio for that pixel, but a reduction is possible; and b) the signal-to-noise ratio typically increases for higher illumination (and hence larger pixel values), but the improvement is not linear or proportional. On this basis, reducing the illumination corresponding to a multiplication of the initial mean pixel values by a factor q, where 0<q<1, may be simulated, respectively achieved. To do so, the initial pixel value y is replaced by a corrected pixel value $y'=q\cdot y+\delta(y, q)$, where $\delta$ is a (pseudo-)random number sampled from a normal distribution with mean value 0 and variance $$\sigma_\delta^2 = \sigma_y^2 \cdot (q'^2 - q^2),$$

where $$q' = \frac{\sigma_y(qy)}{\sigma_y(y)}$$

is the factor by which the standard deviation $\sigma_y(q, y)$ of the noise of the output raw image data 150 is reduced for a real pixel value reduction of a factor q. Note that q<q'<1. This transformation represents a noise-consistent scaling operation, which will be denoted by the symbol S(y, q), that is, $S(y, q)=q\cdot y+\delta(y, q)$, and the use of which in the context of the present invention will become more clear in the following. In fact, when applied correctly, this transformation can be used to perform more sophisticated operations in the context of image correction.

In the specific case of a Poisson-Gaussian noise model, the variance to be used for the pseudorandom number $\delta(y, q)$ is given by $$\sigma_\delta^2 = \frac{y - \mu_{y,dark}}{K} q(1-q) + \sigma_{y,dark}^2(1-q^2).$$

Bad Pixel Correction

In prior art bad pixels are typically corrected in the hardware of the imaging device or in software as part of the processing pipeline, by interpolation with neighboring pixels which are working correctly. As a result of the interpolation, the resulting pixel value fluctuates less than it would for a working pixel, and interpolated pixels can be clearly identified by a different photo-response curve.

Since the noise of the bad pixels is below the expectation, their statistics can be made consistent with the noise model by adding noise. This is achieved with the help of noise-consistent scaling. Consider, for example, a bad pixel whose value $y_C$ should be replaced by using the left and right neighbors with values $y_L$ and $y_R$. One may assign to the value $y_C$ the equation $$y'_C = S(y_L + y_R - \mu_{y,dark}, q=\tfrac{1}{2})$$

which reproduces on average the same value as by using interpolation and which in addition reproduces the standard deviation of $y_C$ that is consistent with the noise model.

Flat-Field Correction

Apertures, lenses and filters often result in a spatially inhomogeneous "capturing" of incoming photons, as for example in vignetting: A uniformly illuminated scene appears darker towards the edges when imaged. In the prior art, a standard way to correct for this is by normalizing to a reference flat-field image N(i, j), where i and j denote pixel coordinates, through $$y'(i, j) = y(i, j)/N(i, j).$$

Here, the flat-field image should be as noise-free as possible, which can be achieved by fitting a mathematically smooth function to the reference image, or by averaging a large number of reference images. In addition one usually wants to preserve the brighter parts of the original image (usually the center), such that N(i, j) should be normalized to the range 0<N(i, j)≤1.

While this method can be used to normalize the brightness of the image, it will no longer be possible to use the same noise model for the entire image: The previously darker parts now have the same brightness, but they have larger relative noise than the previously brighter parts of the image.

In the present invention, a noise-consistent flat-field correction is achieved by using noise-dependent scaling with a pixel-dependent factor q(i, j) to darken the brighter parts of the image. All the considerations of noise-consistent scaling still apply, namely with respect to use of the equation y'=q·y+δ(y, q) for determining corrected pixel values, and the value for q(i, j) such as to ensure noise-consistent flat-field correction is $$q(i, j) = \frac{\min_{i,j} N(i, j)}{N(i, j)}.$$

Correction of Photo-Response-Non-Uniformity

Photo-Response-Non-Uniformity is a special kind of inhomogeneous illumination caused by the varying detection efficiency of the individual pixels. The differences are usually on the order of 1% to 2% and can, among other things, be caused by differences of absorption in the active area of the pixel.

The varying detection efficiency is equivalent to inhomogeneous illumination or exposure and can be corrected in the same way as flat-field correction by using as N(i,j) the spatially varying relative detection efficiency, determined through careful calibration, of an image sensor used to take the image data.

Binning and Averaging

The methods of noise-consistent processing presented above ensure that the output raw image data 150 remain consistent with the input noise model 120. In many use cases, it is required or of interest to perform processing that leads to a modified output noise model 160, which, however, remains applicable to the entirety of the output raw image data 150. One may, for example, sacrifice spatial resolution with a binning operation, and in turn gain in signal-to-ratio. It is here important to update the noise model, such that the next processing step can distinguish binned data with a consistently modified noise model from cropped data where the noise model remains the same and thus is inconsistent with the binned data.

One realization of a binning operation consists of forming a sum of groups of N=n·m pixels, such that for each group there is an output pixel with value $$Y = \Sigma_{i=1}^{N} y_i,$$

where the index i labels the spatial position in the block to be binned.

The output noise model $\sigma_Y(\mu_Y)$ must be updated to take into account the new dark conditions. Specifically, Y has N times the contribution of the black level, i.e. $\mu_{Y.dark} = N\mu_{y.dark}$, and the readout noise in the output model is $\sigma_{Y.dark} = \sqrt{N}\sigma_{y.dark}$.

In a different realization of the binning operation, the output pixel value is calculated as $$Y = (\Sigma_{i=1}^{N} y_i) - (N-1)\mu_{y.dark}.$$

This has the advantage that the black level of the output noise model is identical to that of the input noise model, such that the range of scarcely used pixel values between 0 and $\mu_{y.dark}$ is not unnecessarily enlarged.

In contrast to the binning operation based on average described below, the above two binning operations map integers to integers, and there is no risk for loss of precision associated to rounding or discarding fractional parts.

In another version of the binning operation, the output pixel value is obtained by forming the average of the input pixel values, $$Y' = \frac{1}{N}\sum_{i=1}^{N} y_i.$$

This is particularly useful when the digital representation of the output raw image data 150 is a bounded data type, such as an integer value with fixed bit depth, because it avoids clipping of sums of large values. In the case of averaging, the black level of the data remains unchanged, but the output noise is smaller than the input noise, $\sigma_{Y'}(\mu) \leq \sigma_y(\mu)$. In particular, $\sigma_{Y'.dark} = \sigma_{y.dark}/\sqrt{N}$, and in the case of the Poisson-Gaussian noise model, the gain parameter of the output model is equal to K/N.

One can similarly sum or average pixels at the same position but of different exposures. In this case, the output raw image data 150 will have the same dimension as the input raw image data 110, but the output noise model 160 must be modified in the same way as for spatial sums or averages. For example, N exposures can be averaged to obtain an output image with pixel values $$Y' = \frac{1}{N}\sum_{i=1}^{N} y_i,$$

where the index i now labels the exposure number, and the values $y_i$ represent the same position in the image data as the output pixel value $Y'$. In the output noise model of the exposure average, $\sigma_{Y'.dark} = \sigma_{y.dark}/\sqrt{N}$, and in the case of a Poisson-Gaussian noise model, the output gain parameter is equal to K/N.

Normalization

Some embodiments for noise-consistent processing will have as input raw image data 110 a sequence of images coming from a number M of different devices with Poisson-Gaussian noise-models that have different parameters $\{(K_i, \mu_{y.dark}^{(i)}, \sigma_{y.dark}^{(i)}) \vee i=1,2 \ldots, M\}$, and the goal of the processing is to produce output raw image data 150 formed by a sequence of output images following a single output noise model 160. This can be achieved by determining which noise model has the highest normalized readout noise $$\sigma_\epsilon = \max_i \frac{\sigma_{y.dark}^{(i)}}{K_i},$$

and assigning for each pixel value $y_i$ of input image i an output pixel value $\epsilon_i$ as $$\epsilon_i = \frac{y_i - \mu_{y.dark}^{(i)}}{K_i} + \delta_i,$$

where $\delta_i$ is a (pseudo-)random number sampled from a normal distribution with mean value 0 and variance $$\sigma_\epsilon^2 - \left(\frac{\sigma_{y.dark}^{(i)}}{K_i}\right)^2.$$

The parameters for the common output noise model 160 will then be $\{K=1, \mu_{\epsilon.dark}=0, \sigma_{\epsilon.dark}=\sigma_\epsilon\}$.

Integer Quantization

In several of the above-mentioned operations, corrections use floating point operations or floating point random numbers, and changes with respect to the input pixel value may be small. The overall correction may in fact be smaller than unity, for example, if a reduction of 2% should be applied to a pixel value of 10, the effective corrected pixel value may be 9.8. In general, such small corrections may be applied by saving the corrected value in a non-integer representation (e.g.

fixed-point, floating-point or rational number). However, in many use-cases, having an output in integer representation is desirable. Naïve implementations, such as truncating or rounding, may result in a difference between the desired correction coefficient and the effective applied correction. For example, truncating or rounding may introduce an unintended shift of the statistical mean of the image data, also known as bias. To avoid this, a preferred embodiment of a method according to the present invention provides a noise-consistent rounding operation that involves dithering, i.e the addition of a suitably chosen random number $\Delta$, which is different for each pixel, before the actual rounding operation, i.e.

$y'=\text{round}(y+\Delta)$.

Of particular interest are random numbers that follow a uniform distribution between $-\frac{1}{2}$ and $+\frac{1}{2}$, and random numbers that follow a triangular distribution between $-1$ and $+1$, i.e. the distribution that is formed by adding two independent samples of said uniform distribution, because both distributions introduce zero bias. Moreover, the latter gives quantization noise that is uncorrelated with $\Delta$. Some applications may benefit from the use of other random distributions for $\Delta$.

The quantization operation introduces a slight amount of extra noise, which requires to adapt the readout noise of the output noise model according to $\sigma'_{y.dark}{}^2 = \sigma_{y.dark}^2 + \sigma_\Delta^2$, where $\sigma_\Delta^2$ is the variance of the distribution for the random number $\Delta$. Because of this additional noise and to minimize the introduction of processing errors, preferred implementations of processing pipelines according to the present invention perform quantization only once and as the last operation of the pipeline.

Image Synthesis by Exposure and Gain Scaling

The normalization procedure presented above is well-suited for machine learning and algorithm testing, because it allows to gather data from a multitude of sources without increasing the number of noise models that the algorithm must be able to handle or be tolerant against. To further increase the amount of training or testing data, one can simulate images that have a reduced signal-to-noise ratio within the same noise model. This noise model can either be the model of a single set of original input data 100, or of a set of normalized input data generated by following the procedure set out above. Synthetic images with properties equivalent to a reduction of exposure time or of detection efficiency by a factor q can then be generated by applying to each pixel with value y of the input raw image data 110 the noise-consistent scaling S(y, q) such as defined above in more detail.

In other situations, it is desirable to increase the noise level while keeping the signal constant. For a Poisson-Gaussian input noise model, this can be achieved in two ways. The trivial way is to add (pseudo-)random values $\delta$ with 0 mean and desired standard deviation $\sigma_\delta$ to all pixel values of the input image data 110. This effectively corresponds to increasing the read-out noise parameter, which in the output noise model should be changed to $\sqrt{\sigma_{y.dark}^2 + \sigma_\delta^2}$. Another approach consists of the combination of normalization and exposure scaling by factor q, followed by an application of a new gain factor K'=K/q and adding back the input black level $\mu_{y.dark}$, $$y' = \frac{K}{q} S\left(\frac{y - \mu_{y.dark}}{K}, q\right) + \mu_{y.dark}.$$

With this transformation, the output raw image data 150 will statistically have the same mean values as the input raw image data 110, and the output noise model has the new parameters $\{K'=K/q, \mu_{y.dark}, \sigma_{y.dark}'=\sigma_{y.dark}/q\}$.

It is clear from the above description that said processing step 130 of a method according to the present invention in general, i.e. in all cases, comprises, on the one hand, determining, based upon said input noise model 120 and depending on said processing operation(s) applied to the input raw image data 110, an output noise model 160 adapted to reflect noise present in said output data 140, as well as, on the other hand, producing, based upon said processing operation(s) applied to the input raw image data 110 as well as on said input noise model 120 and/or said output noise model 160, output raw image data 150 which is statistically consistent with said output noise model 160, these two steps of course depending on one another.

In practice, either the processing consists in an operation (or series of operations) which is noise-consistent and thus happens within the input noise model, i.e. by using the input noise model as the output noise model, or the processing consists in an operation (or series of operations) which isn't noise-consistent and thus simultaneously modifies the input noise model such as to produce an output noise model that is consistent with the processed image data.

In case of the first solution mentioned here above, said processing step 130 preferably comprises applying a transformation S(y, q) representing a noise-consistent operation to the values y of a given pixel of an image sensor used to take the image data, where q is a pixel value reduction factor, with 0<q<1, said processing step 130 using an output noise model 160 which is identical to the input noise model 120.

In case of the second solution mentioned here above, said processing step 130 preferably comprises applying a noise-inconsistent operation to the values y of a given pixel of an image sensor used to take the image data, said processing step 130 using an output noise model 160 which is different as compared to the input noise model 120 and statistically consistent with the noise of the output raw image data 150 of the output data 140.

A way to verify that acquired image data is consistent with an associated noise model is to acquire a set of images under identical conditions such that all differences between pairs of individual images can be attributed to noise. Preferably, the pixel values of a single image should cover a large fraction of all possible pixel values. For each pixel position i, the mean $\mu_i$ and standard deviation $\sigma_i$ is then calculated using all images in the set. The larger the number of images in the set, the better the estimates of mean $\mu_i$ and standard deviation $\sigma_i$. Finally, it is checked if the points ($\mu_i$, $\sigma_i$) are well approximated by the function $\sigma_y(\mu_y)$ of the noise model. Similarly, it can be verified that the output noise model of a processing operation is consistent with the output noise model by passing each individual image of said set through the processing operation and extracting means and standard deviations ($\mu'_i$, $\sigma'_i$) for each pixel position in the output image data. The output noise model is considered to be consistent with the output image data if all points ($\mu'_i$, $\sigma'_i$) are well approximated by the function $\sigma'_y(\mu'_y)$ of the output noise model.

Figure 2:
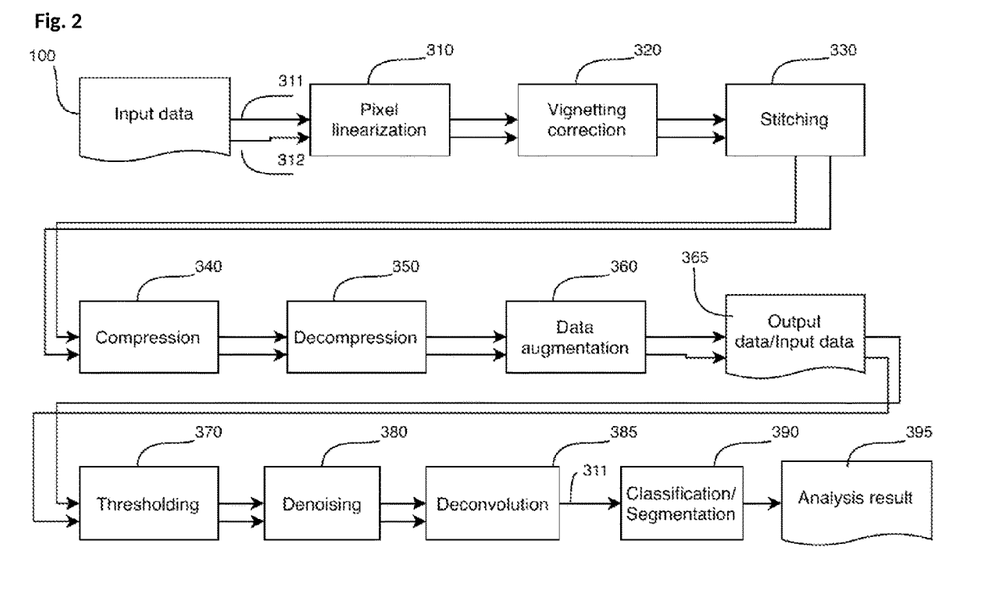
FIG. 2 is an illustration of an embodiment of a method of noise-consistent image processing according to the present invention combining several features to optimize the performance of the image processing pipeline which starts from initial input data that consist of input raw image data and input noise model.

FIG. 2 is an illustration of an embodiment of a method of noise-consistent image processing according to the present invention combining several features to optimize the overall performance of the image processing pipeline which starts from initial input data 100 that consists of input raw image data 110 and input noise model 120. Each two arrows 311, 312 connecting subsequent blocks 310, 320, 330, 340, 350, 360, 370, which each schematically represent a processing operation, symbolize the fact that both raw image data and noise model information is propagated through each processing operation, given that in the context of the present invention the input data 100 need to consist of both input raw image data 110 and noise model 120. This input data is processed through one or more operations 310, 320, 330, 340, 350, 360, 370. The operations treat input data (image data and noise model) and deliver processed output raw image data 150 and output noise model 160 associated with the processed output raw image data, these two parts together forming output data 140. The availability of the noise model at operations 310, 320, 330, 340, 350, 360, 370 enhances the performance of the operations. Optionally, a specific processing operation 385, i.e. a specific element of the processing pipeline, is able to make use of both image and noise data, however it is only able to output image data, such as schematically illustrated in FIG. 2 by the fact that only one arrow 311 exits the block corresponding to this specific processing operation 385, which might be added at the end of the processing pipeline and which might for example consist in deconvolution. Before this specific processing operation 385, however, at each intermediate step, both raw image and noise model data are available, so that the output data 365 from a previous processing operation is the input data 365 for the next processing operation. Optionally, certain additional processing operations 390, which might also be added at the end of the processing pipeline and which might consist in classification or segmentation, may not require and/or output noise model data, but may still benefit from the higher quality of the processing pipeline up to that point in a method of noise-consistent image processing according to the present invention, so that the end result 395 is more precise, better qualified and more reliable.

Figure 3:
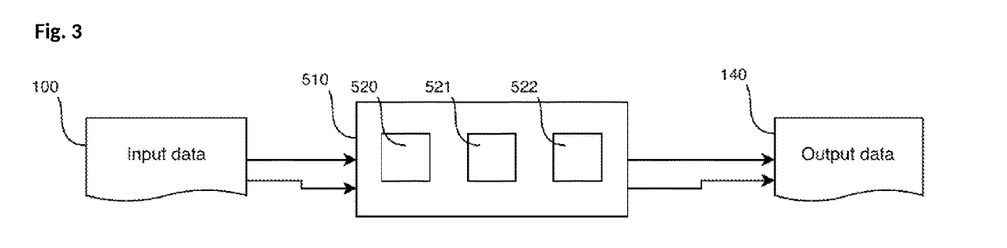
FIG. 3 schematically illustrates that, for some embodiments of a method of noise-consistent image processing according to the present invention, two or more processing operations operating on input data may be combined into a single processing operation that performs the combined function of each of said processing operations.

FIG. 3 schematically illustrates that for some embodiments of a method of noise-consistent image processing according to the present invention, two or more processing operation, symbolized in FIG. 3 by blocks 520, 521, 522 and operating on input data 100, may be combined into a single processing operation 510 that performs the combined function of each of the individual processing operations 520, 521, 522 such as to produce output data 140 consisting of both output raw image data 150 and output noise model 160. As an example, pixel linearization and vignetting correction may be combined into one single processing operation 510. Each two arrows connecting in FIG. 3 subsequent blocks 100, 510, 140 again symbolize the fact that both raw image data and noise model information is propagated through each processing operation combined into a single processing operation.

Finally, the present invention is also related to computer program means stored in a computer readable medium adapted to implement the method set out above as well as to a device equipped with such computer program means. For example, such device may consist in a microprocessor, a field-programmable gate array, an image sensor, a mobile phone, in particular a smart phone equipped with a digital camera, a digital photo apparatus, a digital video camera, a scanning device, a tablet, a personal computer, a server, a microscope, a telescope, or a satellite.

In light of the above description of various embodiments of a method according to the present invention, its advantages are clear.

First, access to a consistent noise model according to the present invention provides strong benefits to a variety of image processing applications. In fact, as the noise model describes the statistical uncertainty of the image data, it provides valuable insights in terms of tolerance limits and reproducibility in particular for scientific and metrological applications. This is enabled by a method according to the present invention. Conversely, the absence of a consistent noise model reduces the reliability of image processing and analysis, where the outcome may depend on the degree of correction or preprocessing applied to the image data. This may be avoided by use of a method according to the present invention.

Secondly, access to a consistent noise model according to the present invention also provides strong benefits to applications relying on machine learning techniques for the processing and/or interpretation of image data, because this allows for the availability of large amounts of high-quality training data due to the fact noise that models may be used to enhance the efficiency and eliminate a possible point of confusion of the algorithm. In the context of machine learning, this is even more important, because machine learning algorithms make much stronger use of (statistical) properties of the data than human observers who ignore statistical properties, such as noise and noise correlations.

The invention claimed is:

1. A method for processing of image data, wherein said image data comprises noise and information, the method comprising the steps of:
   acquiring input data comprising input raw image data to be processed for storage and/or transmission, said input raw image data comprising values y of pixels of an image sensor used to take the image data,
   processing said input raw image data,
   outputting the processed image data by providing output data,
   wherein the step of acquiring input data comprises the step of
     acquiring an input noise model from said input data, said input noise model being adapted to reflect noise present in said input raw image data, said input raw image data and said input noise model together forming said input data in a manner linking the input raw image data to the input noise model,
   wherein the step of processing said input raw image data comprises at least one of the processing operations of
     correcting pixel values of said input raw image data,
     applying flat-field correction to said input raw image data,
     applying correction of photo-response-non-uniformity to said input raw image data, applying a binning and/or averaging operation to said input raw image data, performing normalization of said input raw image data, applying a rounding and/or truncation operation and/or integer quantization to said input raw image data, performing image synthesis, in particular by creating and/or adding synthetic images based upon said input raw image data and/or by modulating said input raw image data, said processing step further comprising the steps of determining, based upon said input noise model and depending on said processing operation(s) applied to the input raw image data, an output noise model adapted to reflect noise present in said output data, and producing, based upon said processing operation(s) applied to the input raw image data as well as on said input noise model and/or said output noise model, output raw image data which is statistically consistent with said output noise model, wherein the step of outputting the processed image data comprises storing and/or transmitting said output raw image data and said output noise model, which together form said output data, in a manner linking the output raw image data to the output noise model, such as to allow for processing of said output data, as input data, by any one of said processing operations, alone or in any combination thereof, such that said processing is adapted for pipeline processing.

2. The method according to claim 1, wherein said input noise model and/or said output noise model is/are represented by a mapping $\sigma_y(\mu_y)$ of mean pixel values $\mu_y$ of the values y of a given pixel of the image sensor used to take the image data to pixel value standard deviations $\sigma_y$, a mapping $\sigma_y^2(\mu_y)$ of mean pixel values $\mu_y$ to pixel value variances $\sigma_y^2$, or a mapping $SNR_y(\mu_y)$ of mean pixel values $\mu_y$ to signal-to-noise ratios $SNR_y$.

3. The method according to claim 1, wherein said input noise model and/or said output noise model is/are represented by:

a finite set of points which is adapted for obtaining a continuous model $\sigma_y(\mu_y)$ by linear or non-linear interpolation a set of coefficients adapted for constructing a polynomial function approximating a continuous model $\sigma_y(\mu_y)$, or a function with free parameters for a continuous model $\sigma_y(\mu_y)$, combined with specific values for said parameters, where $\sigma_y$ is the standard deviation of the values y of a given pixel of an image sensor used to take the image data to its mean value $\mu_y$.

4. The method according to claim 1, wherein said input noise model and/or said output noise model is/are adapted to represent noise in said input raw image data and/or said output raw image data which follows a Poisson-Gaussian distribution described by $$\sigma_y(\mu_y) = \begin{cases} \sigma_{y.dark} & \text{for } \mu_y < \mu_{y.dark} \\ \sqrt{K(\mu_y - \mu_{y.dark}) + \sigma_{y.dark}^2} & \text{otherwise.} \end{cases}$$

where $\sigma_y$ is the standard deviation of the values y of a given pixel of the image sensor used to take the image data to its mean value $\mu_y$, $\sigma_{y.dark}$ is the standard deviation of the pixel values in the absence of light, $\mu_{y.dark}$ is the mean value of the pixel values in the absence of light, and K is a gain factor.

5. The method according to claim 1, wherein said processing step comprises applying a transformation $S(y, q)$ representing a noise-consistent operation to the values y of a given pixel of an image sensor used to take the image data, where q is a pixel value reduction factor, with $0<q<1$, said processing step using an output noise model which is identical to the input noise model.

6. The method according to claim 5, wherein said transformation $S(y, q)$ representing a noise-consistent scaling operation is described by $y'=q \cdot y + \delta(y, q)$, where $y'$ is a corrected pixel value after applying said transformation, $\delta$ is a (pseudo-)random number sampled from a normal distribution with mean value 0 and variance $\sigma_\delta^2 = \sigma_y^2 \cdot (q'^2 - q^2)$ and where $$q' = \frac{\sigma_y(qy)}{\sigma_y(y)}$$

is a factor by which the standard deviation $\sigma_y(qy)$ of the noise of the output raw image data (150) is reduced for pixel value reduction factor q, with $q<q'<1$.

7. The method according to claim 4, wherein the variance of the distribution of said (pseudo-)random number $\delta$ of said transformation $S(y, q)$ representing a noise-consistent scaling operation is described by $$\sigma_\delta^2 = \frac{y - \mu_{y.dark}}{K} q(1-q) + \sigma_{y.dark}^2 (1 - q^2).$$

8. The method according to claim 1, wherein said processing step comprises applying a noise-inconsistent operation to the values y of a given pixel of an image sensor used to take the image data, said processing step using an output noise model which is different as compared to the input noise model and consistent with the noise of the output raw image data of the output data.

9. The method according to claim 5, wherein said at least one processing operation applied during the step of processing said input raw image data is chosen from the group of processing operations comprising correcting pixel values of said input raw image data, applying flat-field correction to said input raw image data, applying correction of photo-response-non-uniformity to said input raw image data, each of said processing operations being applied to the input raw image data in a manner that the output noise model is identical to the input noise model, by ensuring that the input noise model remains valid for all pixel values of the output raw image data.

10. The method according to claim 9, wherein correcting pixel values of said input raw image data is performed by replacing bad pixel values $y_C$ by using neighboring pixel values $y_L$ and $y_R$ for assigning corrected pixel values $y'_C = S(Y_L + Y_R - \mu_{y.dark}, q=\frac{1}{2})$, where q is the pixel value reduction factor and $\mu_{y.dark}$ is the mean value of the pixel values in the absence of light, and/or applying flat-field correction to said input raw image data is performed by assigning corrected pixel values $y' = q \cdot y + \delta(y, q)$ by using a pixel-dependent reduction factor $q(i, j)$ according to $$q(i, j) = \frac{\min_{i,j} N(i, j)}{N(i, j)},$$

with N(i,j) representing a reference flat-field image and with i and j denoting pixel coordinates, and/or applying correction of photo-response-non-uniformity to said input raw image data is performed by assigning corrected pixel values y'=q·y+δ(y, q) by using a pixel-dependent reduction factor q(i, j) according to $$q(i, j) = \frac{\min_{i,j} N(i, j)}{N(i, j)},$$

with N(i, j) representing a spatially varying relative detection efficiency, determined by calibration, of an image sensor used to take the image data and with i and j denoting pixel coordinates.

11. The method according to claim 8, wherein at least one processing operation applied during the step of processing said input raw image data is chosen from the group of processing operations comprising applying a binning and/or averaging operation to said input raw image data, performing normalization of said input raw image data, applying a rounding and/or truncation operation and/or integer quantization to said input raw image data, performing image synthesis by creating and/or adding synthetic images based upon said input raw image data and/or by modulating said input raw image data, each of said processing operations being applied to the input raw image data in a manner that the output noise model is different as compared to the input noise model, by ensuring that the output noise model determined during the step of processing is valid for all pixel values of the output raw image data.

12. The method according to claim 11, wherein:

applying a binning operation to said input raw image data is performed by forming groups of N=n·m pixels or of N exposures, assigning to each group an output pixel value $Y=\sum_{i=1}^{N} y_i$, with i denoting pixel coordinates, and determining the corresponding output noise model $\sigma_Y(\mu_Y)$ by increasing the black level to $\mu_{Y.dark}=N\mu_{y.dark}$ and the readout noise to $\sigma_{Y.dark}=\sqrt{N}\sigma_{y.dark}$, and/or applying a binning operation to said input raw image data is performed by forming groups of N=n·m pixels, assigning to each group an output pixel value $Y=(\sum_{i=1}^{N} y_i)-(N-1)\mu_{y.dark}$, with i denoting pixel coordinates, and determining the corresponding output noise model $\sigma_Y(\mu_Y)$ by maintaining the black level $\mu_{y.dark}$ and increasing the readout noise to $\sigma_{Y.dark}=\sqrt{N}\sigma_{y.dark}$, and/or applying an averaging operation to said input raw image data is performed by forming groups of N=n·m pixels, assigning to each group an output pixel value $\acute{Y}=1/N\sum_{i=1}^{N} y_i$ and determining the corresponding output noise model $\sigma_Y(\mu_Y)$ by maintaining the black level $\mu_{Y.dark}$ and reducing the readout noise to $\sigma_{\acute{Y}.dark}=\sigma_{y.dark}/\sqrt{N}$, and/or performing normalization of said input raw image data is done by determining, for a sequence i=1,2 . . . , M} of image input data coming from a number M of different devices with Poisson-Gaussian noise-models having different parameters $\{(K_i, \mu_{y.dark}^{(i)}, \sigma_{y.dark}^{(i)})\sqrt{}$ i= 1,2 . . . , M}, the input noise model having the highest normalized readout noise $$\sigma_\epsilon = \max_i \frac{\sigma_{y.dark}^{(i)}}{K_i},$$

assigning to each pixel value $y_i$ of image input data (100) with index number i an output pixel value $$\epsilon_i = \frac{y_i - \mu_{y.dark}^{(i)}}{K_i} + \delta_i,$$

with $\delta_i$ being a (pseudo-)random number sampled from a normal distribution with mean value 0 and variance $$\sigma_\epsilon^2 - \left(\frac{\sigma_{y.dark}^{(i)}}{K_i}\right)^2,$$

and with the output noise model, having the parameters $\{K=1, \mu_{\epsilon.dark}=0, \sigma_{\epsilon.dark}=\sigma_\epsilon\}$, being common to all output raw image data (150) of the sequence i=1,2 . . . , M} of image output data, and/or applying a rounding and/or truncation operation and/or integer quantization to said input raw image data is done by addition of a random number Δ, which is different for each pixel, before said rounding/truncation/quantization operation according to y'=round(y+Δ) by simultaneously adapting the readout noise of the output noise model according to $\sigma'_{y.dark}{}^2=\sigma_{y.dark}{}^2+\sigma_{66}{}^2$, where σΔ² is the variance of the distribution for the random number Δ, and/or performing image synthesis, in particular by creating and/or adding synthetic images based upon said input raw image data and/or by modulating said input raw image data, is done by simulating images having a reduced signal-to-noise ratio as compared to the input raw image data and having the same output noise model, this output noise model being realized by the noise model of a single set of input raw image data or by of a set of normalized input raw image data or is done by simulating images having an increased signal-to-noise ratio as compared to the input raw image data.

13. The method according to claim 1, wherein storing and/or transmitting said output raw image data and said output noise model, which together form said output data, in a manner linking the output raw image data to the output noise model is performed by:

storing the output raw image data together with the output noise model in a container file, or storing the output raw image data in a first file and the output noise model in a second, separate sidecar file which is connected to the first file comprising the output raw image data, said sidecar file being adapted to store additional (meta-)data that is not supported by said first file, or storing the output noise model in a database adapted to link specific output raw image data to its associated output noise model.

14. The method according to claim 13, wherein storing and/or transmitting the output noise model is performed by storing and/or transmitting a digital representation of the parameters of said model, said parameters being passed to a function with fixed definition or to a catalog of functions, the specific function to be used in the latter case being selected by an additional identifying parameter.

15. A computer program stored in a tangible computer-readable medium adapted to implement the method according to claim 1.

16. A device equipped with the computer program according to claim 15, wherein the device is chosen from a group comprising a microprocessor, a field-programmable gate array, an image sensor, a mobile phone, in particular a smart phone equipped with a digital camera, a digital photo apparatus, a digital video camera, a scanning device, a tablet, a personal computer, a server, a microscope, a telescope, and a satellite.

17. The method according to claim 6, wherein the variance of the distribution of said (pseudo-)random number $\delta$ of said transformation $S(y, q)$ representing a noise-consistent scaling operation is described by $$\sigma_\delta^2 = \frac{y - \mu_{y,dark}}{K} q(1-q) + \sigma_{y,dark}^2 (1 - q^2).$$

* * * * *